United States Patent
Andersson

(10) Patent No.: US 12,377,747 B2
(45) Date of Patent: Aug. 5, 2025

(54) METHOD TO DETECT VEHICLE BATTERY TYPE BEFORE CHARGE

(71) Applicant: CTEK Sweden AB, Vikmanshyttan (SE)

(72) Inventor: Helge Andersson, Gothenburg (SE)

(73) Assignee: CTEK Sweden AB, Vikmanshyttan (SE)

(*) Notice: Subject to any disclaimer, the term of this patent is extended or adjusted under 35 U.S.C. 154(b) by 941 days.

(21) Appl. No.: 17/279,201

(22) PCT Filed: Mar. 29, 2019

(86) PCT No.: PCT/EP2019/058012
§ 371 (c)(1),
(2) Date: Mar. 24, 2021

(87) PCT Pub. No.: WO2020/064151
PCT Pub. Date: Apr. 2, 2020

(65) Prior Publication Data
US 2022/0032805 A1 Feb. 3, 2022

(30) Foreign Application Priority Data
Sep. 25, 2018 (SE) .................................. 1851142-8

(51) Int. Cl.
*B60L 53/65* (2019.01)
*B60L 53/62* (2019.01)

(52) U.S. Cl.
CPC .............. *B60L 53/65* (2019.02); *B60L 53/62* (2019.02)

(58) Field of Classification Search
CPC .... B60L 53/62; B60L 53/65; H01M 10/0525; H01M 10/06; H01M 10/44;
(Continued)

(56) References Cited

U.S. PATENT DOCUMENTS 6,043,631 A  3/2000 Tsenter
6,218,812 B1 * 4/2001 Hanson ................. H02J 7/0071
320/161
(Continued)

FOREIGN PATENT DOCUMENTS

JP  2009232632 A  10/2009
WO  2017/197383 A1  11/2017

OTHER PUBLICATIONS

International Search Report and Written Opinion for corresponding International Application No. PCT/EP2019/058012 dated Jun. 5, 2019.

*Primary Examiner* — Jack Chiang
*Assistant Examiner* — Aric Lin
(74) *Attorney, Agent, or Firm* — Renner, Otto, Boisselle & Sklar, LLP

(57) ABSTRACT

A method performed by battery charger configured to charge a vehicle battery, the method comprising charging the vehicle battery until a first measured voltage over the battery exceeds a first voltage threshold, halting charging for a third time period, measuring a second voltage over the battery at the end of the third time period, determining a battery type using a differential voltage, by calculating a difference of the first voltage threshold and the second voltage, and a set of predetermined conditions, wherein the predetermined conditions comprise:

$$\text{battery type} = \begin{cases} U_{\text{diff}} > U_{Pb} \rightarrow \text{lead-acid battery type} \\ U_{\text{diff}} < U_{Li} \rightarrow \text{lithium battery type} \\ U_{Pb} > U_{\text{diff}} < U_{Li} \rightarrow \text{unknown battery type} \end{cases}$$

29 Claims, 10 Drawing Sheets

(58) Field of Classification Search
CPC ............... H01M 2220/20; Y02T 10/70; Y02T 10/7072; Y02T 90/12; Y02E 60/10
See application file for complete search history.

(56) References Cited

U.S. PATENT DOCUMENTS

| | | |
|---|---|---|
| 2004/0169489 A1 | 9/2004 | Hobbs |
| 2008/0309284 A1* | 12/2008 | Choksi ............... H02J 7/00041 320/162 |
| 2017/0331162 A1 | 11/2017 | Clarke et al. |
| 2018/0026457 A1* | 1/2018 | Delevski ............... H02J 7/0024 320/106 |

* cited by examiner

METHOD TO DETECT VEHICLE BATTERY TYPE BEFORE CHARGE

This application is a national phase of International Application No. PCT/EP2019/058012 filed Mar. 29, 2019 and published in the English language, which claims priority to Swedish Application No. 1851142-8 filed Sep. 25, 2018, both of which are hereby incorporated herein by reference.

The present invention relates to a method performed by a battery charger configured to charge a battery of a vehicle. In particular, a battery charger configured to charge a starter battery of a vehicle.

BACKGROUND

Vehicles using combustion drive generally includes a starter battery for cranking and starting the engine. Lately lithium starter batteries, such as LiFePO$_4$, based batteries have been introduced as an alternative for lead-acid based starter batteries. Important advantages of lithium starter batteries include improved life length and performance. A lithium or LiFePO$_4$ battery typically comprises four cells connected serially, which produces a total voltage comparable to a traditional lead-acid battery comprising six cells connected serially. Of particular importance is the fact that the voltage, when the battery is fully charged, the battery's characteristic is nearly identical to its lead-acid counterpart. However, the methods for optimally bringing a lead-acid battery to a fully charged state may differ from the methods for bringing a lithium starter battery to a fully charged state.

Conventional battery chargers for vehicles have the drawback that a charging mode must be selected manually to ensure that an appropriate charging method or algorithm is used. Selecting the wrong charging mode may result in increased charging time, or even reduction of the life length of the battery.

A further problem is that some vehicles may have the starter battery hidden or covered in a way that the user has no easy way of determining the type of vehicle battery mounted in the vehicle.

Thus, there is a need for an improved method of charging a vehicle starter battery.

OBJECTS OF THE INVENTION

An objective of embodiments of the present invention is to provide a solution which mitigates or solves the drawbacks described above.

SUMMARY

The above objective is achieved by the subject matter described herein. Further advantageous implementation forms of the invention are described herein.

According to a first aspect of the invention the objects of the invention is achieved by a method performed by battery charger configured to charge a vehicle battery, the method comprising charging the vehicle battery until a first measured voltage over the battery exceeds a first voltage threshold, halting charging for a third time period, measuring a second voltage over the battery at the end of the third time period, determining a battery type using a differential voltage, by calculating a difference of the first voltage threshold and the second voltage, and a set of predetermined conditions, wherein the predetermined conditions comprise $$\text{battery type} = \begin{cases} U_{\textit{diff}} > U_{Pb} \rightarrow \text{lead-acid battery type} \\ U_{\textit{diff}} < U_{Li} \rightarrow \text{lithium battery type} \\ U_{Pb} > U_{\textit{diff}} > U_{Li} \rightarrow \text{unknown battery type} \end{cases}$$

In an embodiment of the first aspect of the invention, the method further comprises selecting a charging mode using the determined battery type. At least one advantage of of the first aspect of the invention is that charging time for the battery can be reduced. A further advantage is that the complexity of the procedure of charging the vehicle battery is reduced, as the battery type does not need to be indicated, in particular at a relatively high SoC.

According to a second aspect of the invention the objects of the invention is achieved by a method performed by a battery charger configured to charge a vehicle battery, the method comprising charging the vehicle battery by providing a current to the battery being charged, repeating the previous step until a first measured voltage over the battery exceeds a first voltage threshold, charging the vehicle battery for a second time period, halting charging for a third time period, measuring a second voltage over the battery, determining a differential voltage by calculating a differential voltage between the first voltage threshold and the second voltage, determining a battery type using the differential voltage and a set of predetermined conditions wherein the predetermined conditions comprise $$\text{battery type} = \begin{cases} U_{\textit{diff}} > U_{Pb} \rightarrow \text{lead-acid battery type} \\ U_{\textit{diff}} < U_{Li} \rightarrow \text{lithium battery type} \\ U_{Pb} > U_{\textit{diff}} > U_{Li} \rightarrow \text{unknown battery type} \end{cases}$$

In an embodiment of the method according to the second aspect of the invention, the method further comprises selecting a charging mode using the determined battery type.

The advantages of the second aspect of the invention are at least the same as for the first aspect of the invention.

According to a third aspect of the invention the objects of the invention is achieved by a method performed by battery charger configured to charge a vehicle battery is provided, the method comprising charging the vehicle battery, determining a trajectory using battery voltage levels measured over time, determining a battery type of the vehicle battery by comparing the determined trajectory to a set of criteria.

In an embodiment of the method according to the third aspect of the invention, the set of criteria compares characteristics of the determined trajectory to characteristics of a set of predetermined trajectories.

In an embodiment of the method according to the third aspect of the invention, the characteristics of the set of predetermined trajectories are indicative of areas formed by the predetermined trajectories and constant SoC levels, and wherein determining the battery type of the vehicle comprises determining that the determined trajectory falls within the areas.

In an embodiment of the method according to the third aspect of the invention, the characteristics of the set of predetermined trajectories are indicative of shapes of the predetermined trajectories, and wherein determining the battery type of the vehicle comprises determining that the determined trajectory matches shapes of the predetermined trajectories.

In an embodiment of the method according to the third aspect of the invention, the battery type of the vehicle battery is determined to a LiFePO4/Lithium battery if the trajectory fulfills a criterion of the shape of the determined trajectory matching a predetermined trajectory indicative of decreasing slope values and increasing battery voltage levels.

In an embodiment of the method according to the third aspect of the invention, the battery type of the vehicle battery is determined to a LiFePO4/Lithium battery only if the slope values decreases with a decreasing rate above a predefined threshold.

In an embodiment of the method according to the third aspect of the invention, the battery type of the vehicle battery is determined to a LiFePO4/lithium battery if the trajectory fulfills the criteria of the trajectory being indicative of slope values below 0.1 Volt per hour and the corresponding measured battery voltage level value is in a range of [13.3V-13.4V].

In an embodiment of the method according to the third aspect of the invention, the battery type of the vehicle battery is determined to a LiFePO4/lithium battery if the trajectory fulfills the criteria of the trajectory being indicative of slope values below 0.25 Volt per hour and the corresponding measured battery voltage level value is in a range of [13.5V-13.65V].

In an embodiment of the method according to the third aspect of the invention, the method further comprises selecting a battery charging mode using the determined battery type.

At least one advantage of the third aspect of the invention is that charging time for the battery can be reduced. A further advantage is that the complexity of the procedure of charging the vehicle battery is reduced, as the battery type does not need to be indicated, in particular at low to medium SoC.

According to a fourth aspect of the invention the objects of the invention is achieved by a method performed by battery charger configured to charge a vehicle battery, the method comprising:
  obtaining (1010) a plurality of determined battery types of the vehicle battery using different methods according to any of claim 1-2, 3-4 or 5-13.
  selecting (1020) a normal battery charging mode if the plurality of determined battery types are identical or if a majority of the determined battery types are identical, or
  selecting a safe battery charging mode if the plurality of determined battery types are not identical or if not a majority of the determined battery types are identical, charging (1030) the vehicle battery using the selected battery mode.

At least one advantage of the fourth aspect of the invention is that charging time for the battery can be reduced. A further advantage is that the complexity of the procedure of charging the vehicle battery is reduced, as the battery type does not need to be indicated regardless of the battery's SoC.

According to a fifth aspect of the invention the objects of the invention is achieved by a battery charger comprising processing circuitry, a memory, comprising computer-executable instructions for causing the battery charger, when the computer-executable instructions are executed on a processing unit comprised in the battery charger, to perform any of the method steps according to any of the first, second third or fourth aspect of the invention.

The advantages of the fifth aspect are at least the same as the advantages of the first to fourth aspects of the invention.

According to a fifth aspect of the invention the objects of the invention is achieved by a computer program is provided and comprises computer-executable instructions for causing a battery charger, when the computer-executable instructions are executed on a processing unit comprised in the battery charger, to perform any of the methods according to the first, second third or fourth aspect of the invention.

According to a sixth aspect of the invention the objects of the invention is achieved by a computer program product is provided and comprising a computer-readable storage medium, the computer-readable storage medium have the computer program according to the fifth aspect embodied therein.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
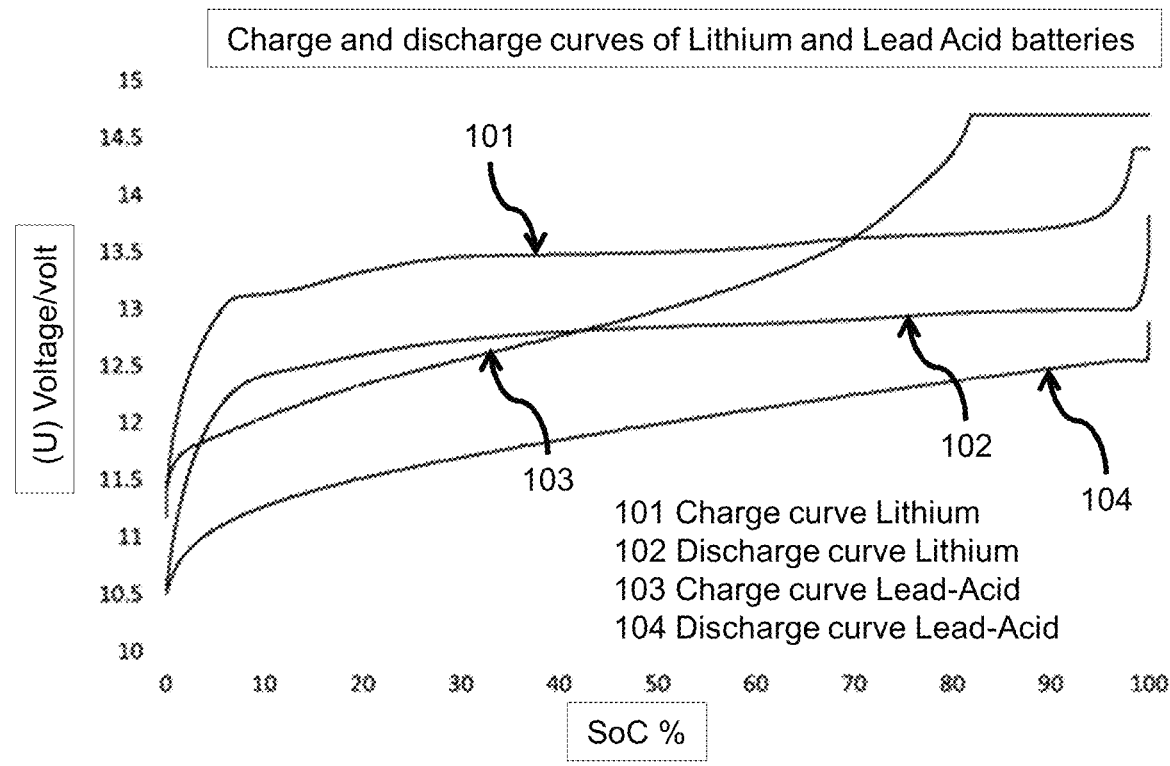
FIG. 1 shows charge/discharge curves of a lithium and lead-acid starter battery respectively.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

An "or" in this description and the corresponding claims is to be understood as a mathematical OR which covers "and" and "or", and is not to be understand as an XOR (exclusive OR). The indefinite article "a" in this disclosure and claims is not limited to "one" and can also be understood as "one or more", i.e., plural.

The term State Of Charge, or SoC, used herein denotes a charging state of a battery related to a maximum capacity of the battery, and are generally given as a percentage value of the maximum capacity of the battery. E.g. SoC=0% signifies an empty battery and SoC=100% signifies a fully charged battery, capable of providing the maximum capacity of the battery.

The term "trajectory", used herein, denotes a trace or path intersecting coordinates, e.g. value pairs, in a coordinate system, e.g. a two dimensional plane formed by a charge/discharge curve slope $\Delta U/\Delta t$ and a voltage level U of a charged battery.

FIG. 1 shows charge/discharge curves 101, 102 of a lithium starter battery, such as LiFePO$_4$, and charge/discharge curves 103, 104 of a lead-acid, LA, starter battery respectively. Voltage over the poles of a battery or battery voltage is shown on the vertical axis and the state of charge, SoC, is shown on the horizontal axis. As can be seen in FIG. 1, to differentiate a lithium battery from a lead-acid battery, both a measured voltage and a SoC must be known. In other words, to only measure the voltage over the poles of the battery is not sufficient to differentiate a lithium battery from a lead-acid battery. The voltage over the poles of the battery will be affected by any load connected to the battery in the vehicle. Such a load and the SoC of the battery is generally unknown to a battery charger connected to the battery. Thus, to only rely on the charging/discharging curves to determine a battery type lead-acid/lithium is problematic. In other words, to simply measure a voltage over the poles of the battery and compare it to charging/discharging curves will provide unreliable results when differentiate a lithium battery from a lead-acid battery.

As can be seen from FIG. 1, the charge/discharge curves 101, 102 related to the lithium battery and the charge/discharge curves 103, 104 related to the lead-acid battery differs most in the range of [10%-80%] SoC or [10%-70%] SoC. However, in particular vehicle batteries used as starter batteries, charging is typically initiated at a relatively high SoC, e.g >80% SoC or e.g >70% SoC. This more ideal range of [10%-80%] SoC for using charging/discharging curves to differentiate a lithium starter battery from a lead-acid starter battery is normally not available for analysis, as the SoC generally exceeds 80%.

One aspect of the present disclosure provides the advantage of being capable of differentiating a lithium starter battery from a lead-acid starter battery at a relatively high level of SoC, such as [10%-70%] SoC or [85%-98%] SoC.

This aspect of the method presented herein, is based on the realization that a lithium battery, such as aLiFePO$_4$ battery, has a slower electrochemical response after being subjected to a current pulse. The time for a lead-acid battery to stabilize the voltage after being subjected to the current pulse is significantly shorter than for a corresponding lithium battery. The voltage over the lead-acid battery is also higher in the range [85%-98%] SoC, than the voltage over the lithium battery in the same range, as can be seen from FIG. 1.

Figure 2:
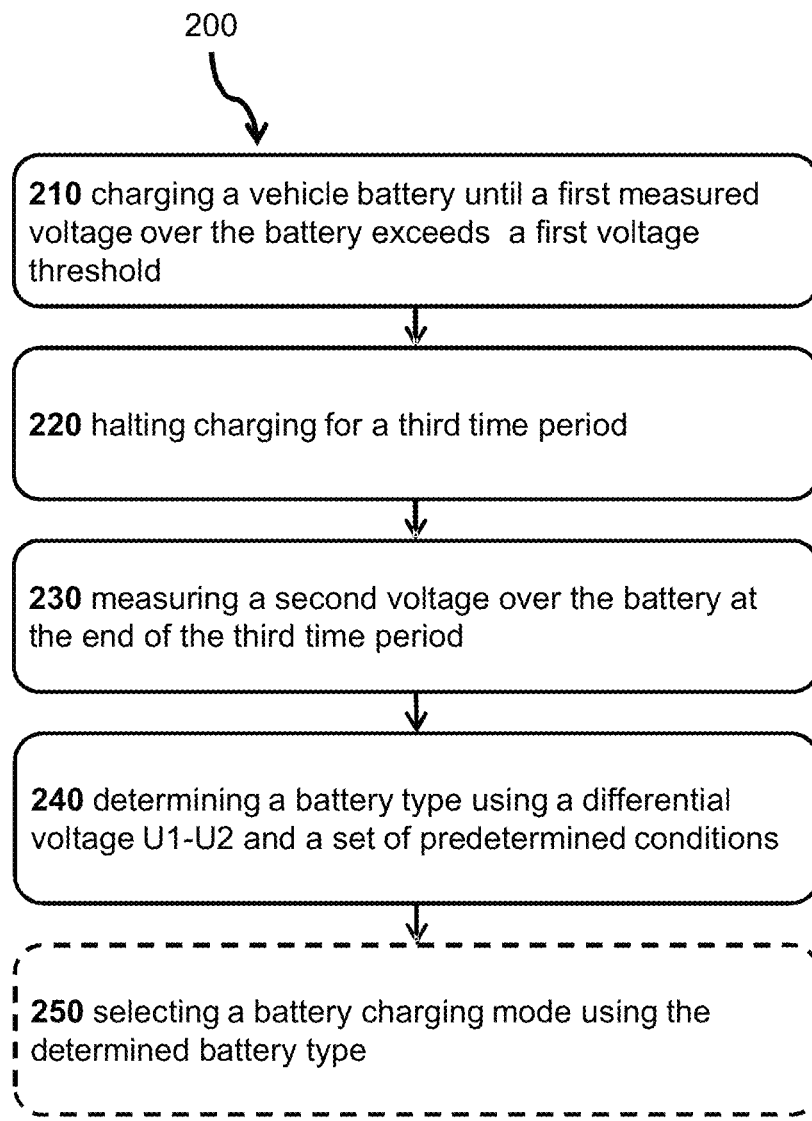
FIG. 2. illustrates a flowchart of a method performed by battery charger configured to charge a vehicle battery according to one or more embodiments of the present disclosure.

FIG. 2. illustrates a flowchart of a method 200 performed by battery charger 400 configured to charge a vehicle battery. The method is particularly suitable when determining the type of battery, e.g. Lead-Acid or Lithium, and thereafter charging the battery, based on the determination, particularly at a relatively high level of SoC, such as >70% SoC or [85%-98%] SoC.

In one embodiment, a method 200 performed by battery charger 400 configured to charge a vehicle battery is provided, the method 200 comprising:

Step 210: charging the vehicle battery until a first measured voltage over the battery, or poles of the battery, exceeds a first voltage threshold $U_1$. Charging may e.g. be performed by providing a constant current $I_1$ or current pulses of amplitude $I_1$ to the battery. The first voltage threshold $U_1$ may be selected from the charge curves in the range of [85%-98%] SoC. In one example $U_1$ may be selected to 14.2V or 14.4 V.

Optionally, the method further comprises further charging the vehicle battery at a constant voltage, equal to the first voltage threshold $U_1$, for a second time period $t_2$. In one example, the second time period $t_2$ may be selected in the range of [1-120] seconds, preferably in the range of [30-90] seconds, and most preferably in the range of [45-75] seconds, e.g. 60 seconds.

Step 220: optionally halting charging for a third time period $t_3$. In other words, allowing the battery to rest for a third period $t_3$. In one embodiment, the third time period $t_3$ may be selected equal to zero, i.e. effectively not halting the charging before proceeding to step 230. In one embodiment, the third time period $t_3$ may be selected equal to or greater than a typical settling time of a lead-acid battery, i.e. a time it takes to stabilize the voltage after being subjected to the current pulse. $t_3$ is further selected shorter than a typical settling time of a corresponding lithium battery, i.e. a time it typically takes to stabilize the voltage over the lithium starter battery after being subjected to the current pulse. In one example, the third time period $t_3$ may be selected in the range of [1-120] seconds, preferably in the range of [15-45] seconds, and most preferably in the range of [20-40] seconds, e.g. 30 seconds.

Step 230: measuring a second voltage $U_2$ over the battery, or poles of the battery at the end of the third time period $t_3$. In other words, measuring the second voltage $U_2$ over the battery after the rest/relaxation in the previous step.

Step 240: determining a battery type using a differential voltage $U_1$-$U_2$ and a set of predetermined conditions. It is understood that the battery type is determined for the vehicle battery.

The predetermined conditions may comprise $$\text{battery type} = \begin{cases} U_{\text{diff}} > U_{Pb} \rightarrow \text{lead-acid battery type} \\ U_{\text{diff}} < U_{Li} \rightarrow \text{lithium battery type} \\ U_{Pb} > U_{\text{diff}} > U_{Li} \rightarrow \text{unknown battery type} \end{cases}$$

An example of $U_1$ is 14.4V. An example of $U_{Pb}$ is 1.2V and an example of $U_{Li}$ 0.8V respectively. A further example of $U_{Pb}$ is 0.7V and a further example of $U_{Li}$ 0.6V Optionally, the method further comprises selecting a battery charging mode using the determined battery type. This step of selecting a battery charging mode may further involve charging the battery. This may involve charging the battery in a lead-acid battery mode if a lead-acid battery type is determined, charging the battery in a lithium battery mode if a lithium battery type is determined or charging the battery in a safe mode if a unknown battery type is determined. The safe mode may involve charging the battery with a voltage that is safe for both a lead-acid battery type and a lithium battery type. In one example, a maximum charging voltage of 13.8 Volts or 14.4 Volts is used in the lead-acid battery mode and the safe mode, and a maximum charging voltage of 14.6 Volts or 14.8 Volts is used in the lithium battery mode.

One further aspect of the present disclosure also provides a method having the advantage of being capable of differentiating a lithium starter battery from a lead-acid starter battery at a relatively high level of SoC, such as [70%-98%] SoC or [85%-98%] SoC. A variation of the method described in relation to FIG. 2 is described below.

Figure 3:
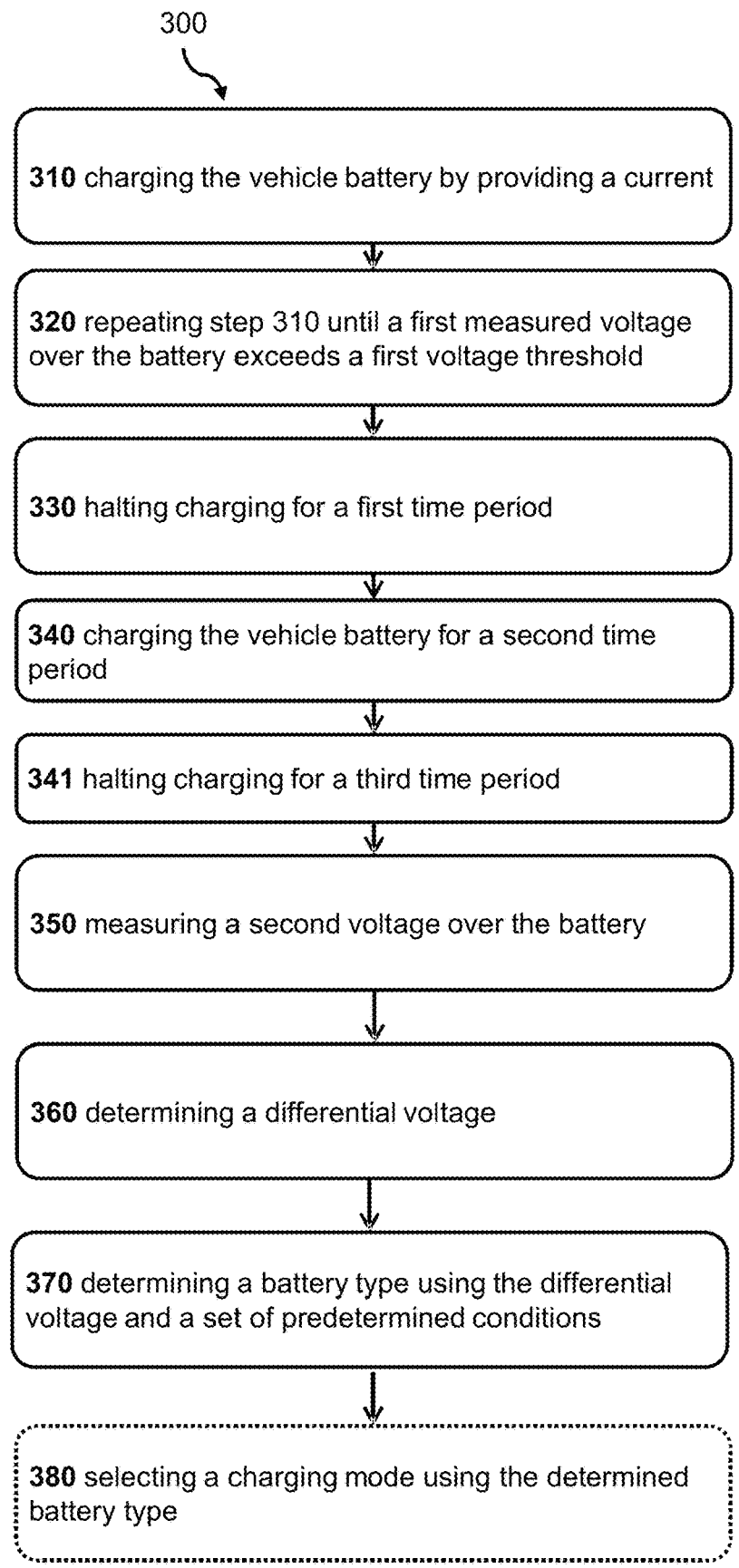
FIG. 3. illustrates a flowchart of a method performed by a battery charger configured to charge a vehicle battery according to one or more embodiments of the present disclosure.

FIG. 3. illustrates a flowchart of a method 300 performed by a battery charger 400 configured to charge a vehicle battery. The vehicle battery may in embodiments be a vehicle starter battery. The method comprising:

STEP 310: charging the vehicle battery by providing a current $I_1$ to the battery being charged.

Providing the current $I_1$ may comprise providing current pulses with an amplitude $I_1$. The current $I_1$ may initially be selected/set to 20 Ampere. The amplitude $I_1$ is typically constant, and the charging method is thus typically constant current charging at this stage.

Step 320: repeating step 310 until a first measured voltage over the battery, or poles of the battery, exceeds a first voltage threshold $U_1$. The voltage threshold $U_1$ may be set to 14. 2 V or 14.4 V. In one embodiment, charging the vehicle battery further comprises the steps of measuring a voltage over the battery, or over the poles of the battery, over time, and/or adapting the current by increasing the current $I_1$ by steps of 5 Ampere if a falling trend of the voltage over the battery is detected. The steps of measuring battery voltage and/or adapting current are repeated for the duration of step 320.

The voltage threshold U1 may e.g. be the same voltage as a predetermined constant voltage level of the charger where an absorption phase of the charging process would be activated.

Optional Step 330: halting charging for a first time period $t_1$. The first time period $t_1$ may be set to a value in the interval [0-60 seconds], preferably to 1 min. This step may be left out in it's entirety.

Step 340: charging the vehicle battery, e.g. by using a constant voltage, e.g. at the threshold $U_1$ of 14.2/14.4 Volts, for a second time period $t_2$. The charging may be performed using a constant voltage of 14.4 Volts, without limiting a charging current $I_2$ or by allowing the battery charger to deliver a current to it's maximum capacity. In other words, the method further comprises charging the vehicle battery by providing a constant voltage to the battery, e.g. 14.4 Volts. Optionally, the method further comprises charging the vehicle battery by providing a current or constant current $I_2$ or current pulses of amplitude $I_2$ to the battery, typically the maximum current the battery charger can provide.

Optional Step 341: halting charging for a third time period $t_3$. In other words, allow the battery to rest for a period $t_3$. The third time period $t_3$ may be set/selected to a value in the range of [0-120], [15-60 seconds], preferably 30 seconds.

Optionally, the third time period $t_3$ may be set/selected to zero (0) seconds, thus effectively eliminating step 341.

Step 350: measuring a second voltage $U_2$ over the battery, or poles of the battery. The second voltage is typically measured after step 340 and/or after 341 and at the end of t3. The second voltage $U_2$ may further be saved to memory, e.g. to a memory of the battery charger.

Step 360: determining a differential voltage $U_{diff}$ by calculating the difference between voltage threshold and the second voltage, $U_1$-U2.

Step 370: determining a battery type using the differential voltage and a set of predetermined conditions. The predetermined conditions may comprise $$\text{battery type} = \begin{cases} U_{diff} > U_{Pb} \rightarrow \text{lead-acid battery type} \\ U_{diff} < U_{Li} \rightarrow \text{lithium battery type} \\ U_{Pb} > U_{diff} > U_{Li} \rightarrow \text{unknown battery type} \end{cases}$$

Typical values for the quantities given herein, such as $U_1$, $U_2$, $U_{Pb}$, $U_{Li}$, $t_2$ and $t_3$ may e.g. be selected from:

$U_1$=14.2/14.4 volt, e.g. set by the properties of the charger such as trigger voltage for the absorption phase.

$U_2$ is measured during the charge procedure and may e.g. be in a range [13.7-13.8 V].

$U_{Pb}$=0.7 volt $U_{Li}$=0.6 volt $t_2$=60 seconds $t_3$=30 seconds

The reason for introducing an unknown battery type is that if a significant load of 50-60 amperes are coupled to the battery, the method will not be able to distinguish the lithium battery from the lead-acid batter with sufficient reliability, thus an unknown battery type is determined.

Optional Step 380: selecting a charging mode using the determined battery type. This may involve charging the battery in a lead-acid battery mode if a lead-acid battery type is determined, charging the battery in a lithium battery mode if a lithium battery type is determined or charging the battery in a safe mode if a unknown battery type is determined. The safe mode may involve charging the battery with a voltage that is safe for both a lead-acid battery type and a lithium battery type. In other words, after the type of battery has been determined the vehicle battery is charged using a method dependent on the determined battery type.

In one example, the lithium battery mode is using a higher maximum charging voltage than the lead-acid battery mode, e.g. the lithium battery mode using a charging voltage >14.4 Volts.

An example of $U_1$ is 14.4V. An example of $U_{Pb}$ is 1.2V and an example of $U_{Li}$ 0.8V respectively.

Figure 4:
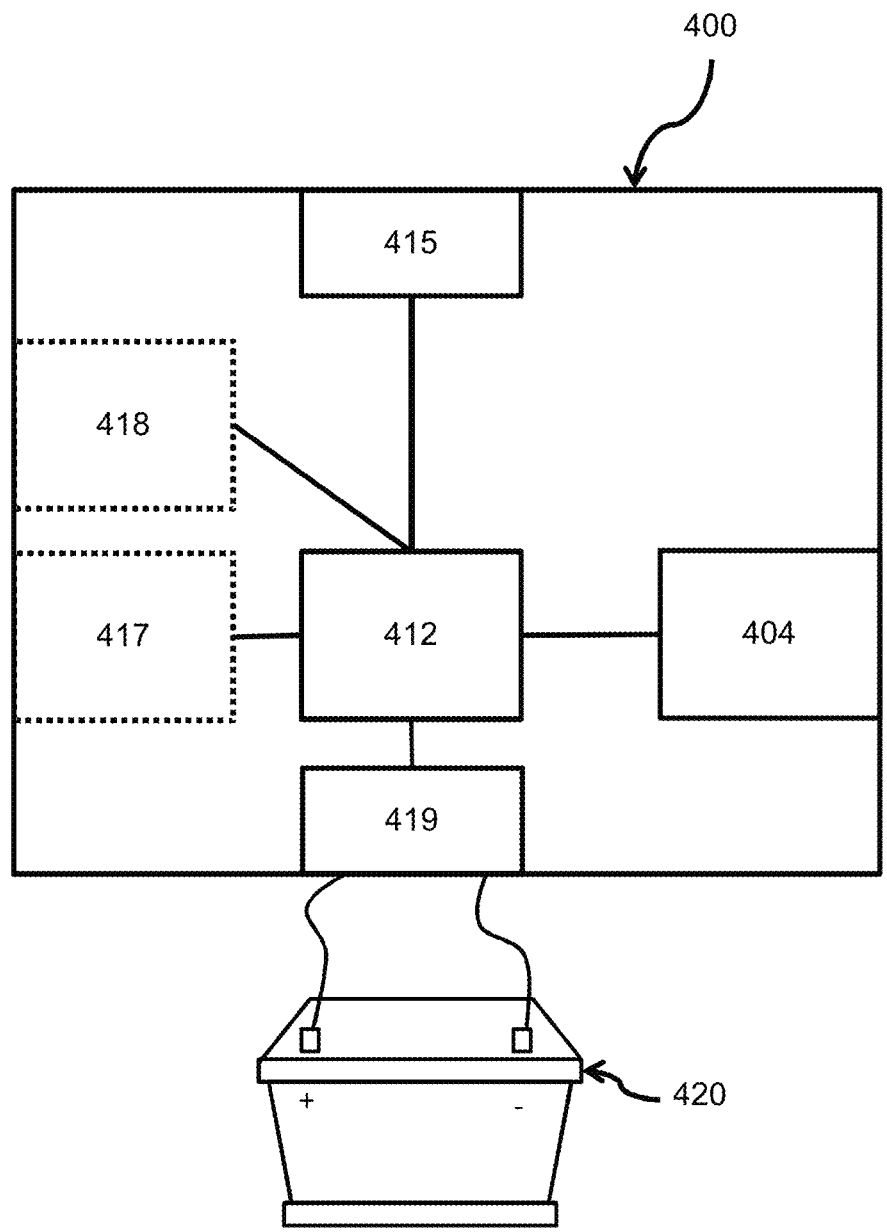
FIG. 4 shows a battery charger according to an embodiment of the present disclosure.

FIG. 4 shows a battery charger 400 according to an embodiment of the present disclosure.

It is understood that the battery charger 400 may be provided with the necessary coupling means, such as clamps and connectors, configured to electrically couple the charger 400 to the battery 420.

The battery charger 400 may be in the form of a vehicle starter battery 420 charger. The battery charger 400 may comprise processing circuitry 412 optionally communicatively coupled to a communications interface 404 for wired and/or wireless communication. Further, the battery charger 400 may further comprise at least one optional antenna (not shown in figure). The antenna may be coupled to a transceiver of the communications interface 404 and is configured to transmit and/or emit and/or receive a wireless signals in a wireless communication system, e.g. send/receive voltage values. In one example, the processing circuitry 412 may be any of a selection of processor and/or a central processing unit and/or processor modules and/or multiple processors configured to cooperate with each-other. Further, the battery charger 400 may further comprise a memory 415. The memory 415 may contain instructions executable by the processing circuitry to perform any of the methods and/or method steps described herein.

The communications interface 404, e.g. the wireless transceiver and/or a wired/wireless communications network adapter, which is configured to send and/or receive data values or parameters as a signal to or from the processing circuitry 412 to or from other external nodes, e.g. a central parameter server providing any of the parameters given above such as $U_1$, $U_2$, $U_{Pb}$, $U_{Li}$, $t_1$, $t_2$ and $t_3$. In an embodiment, the communications interface communicates directly between communication network nodes or via the communications network.

In one or more embodiments the battery charger 400 may further comprise an input device 417, configured to receive input or indications from a user and send a user-input signal indicative of the user input or indications to the processing circuitry 412. The input device 417 may be used to receive any of the parameters given above as input from a user.

In one or more embodiments the battery charger 400 may further comprise a display 418 configured to receive a display signal indicative of rendered objects, such as text or graphical user input objects, from the processing circuitry 412 and to display the received signal as objects, such as text or graphical user input objects. The display may be used to display any of the parameters given above or any of the measured voltages described above.

In one or more embodiments the battery charger 400 may further comprise a controllable power source 419, configured to output voltage and/or current to the starter battery 420 in response to a control signal received from the processing circuitry 412. The controllable power source may be any power source available in the art capable of regulating output voltage and/or output current.

In one embodiment the display 418 is integrated with the user input device 417 and is configured to receive a display signal indicative of rendered objects, such as text or graphical user input objects, from the processing circuitry 412 and to display the received signal as objects, such as text or graphical user input objects, and/or configured to receive input or indications from a user and send a user-input signal indicative of the user input or indications to the processing circuitry 412.

In embodiments, the processing circuitry 412 is communicatively coupled to the memory 415 and/or the communications interface 404 and/or the input device 417 and/or the display 418 and/or one or more sensors (not shown in the figure), e.g. voltage sensors capable of measuring the voltage over the connected vehicle/starter battery, and/or the controllable power source 419.

In embodiments, the communications interface and/or transceiver 404 communicates using wired and/or wireless communication techniques. In embodiments, the one or more memory 415 may comprise a selection of a hard RAM, disk drive, a floppy disk drive, a magnetic tape drive, an optical disk drive, a CD or DVD drive (R or RW), or other removable or fixed media drive.

In a further embodiment, the battery charger 400 may further comprise and/or be coupled to one or more additional sensors (not shown) configured to receive and/or obtain and/or measure physical properties pertaining to the vehicle battery 420 and/or battery charger 400, and send one or more sensor signals indicative of the physical properties to the processing circuitry 412, e.g. sensor data indicative of battery voltage.

The battery charger may be in the form of any one of a stand-alone battery charger, a battery charger integrated into a vehicle, an on-board computer, an Electronic Control Unit (ECU), a digital information display, a stationary computing device, a laptop computer, a tablet computer, a handheld computer, a wrist-worn computer, a smart watch, a PDA, a Smartphone, a vehicle mounted computer system or a navigation device.

In one embodiment, a computer program is provided and comprises computer-executable instructions for causing a battery charger 400, when the computer-executable instructions are executed on a processing unit comprised in the battery charger 400, to perform any of the method steps described herein.

In one embodiment, a computer program is provided and comprises computer-executable instructions for causing a battery charger, when the computer-executable instructions are executed on a processing unit comprised in the battery charger, to perform any of the method steps described herein.

In one embodiment, a computer program product is provided and comprising a computer-readable storage medium, the computer-readable storage medium have any of the computer programs above embodied therein.

In one embodiment, a carrier containing the computer program above, wherein the carrier is one of an electronic signal, optical signal, radio signal, or computer readable storage medium.

In embodiments, the communications network communicate using wired or wireless communication techniques that may include at least one of a Local Area Network (LAN), Metropolitan Area Network (MAN), Global System for Mobile Network (GSM), Enhanced Data GSM Environment (EDGE), Universal Mobile Telecommunications System, Long term evolution, High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, WirelessMAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (Wi-MAX) and ultrasonic communication, etc., but is not limited thereto.

Moreover, it is realized by the skilled person that the battery charger 400 may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, encoder, decoder, power supply units, power feeders, communication interfaces, communication protocols, etc. which are suitably arranged together for performing the present solution.

Especially, the processor and/or processing means of the present disclosure may comprise one or more instances of processing circuitry, processor modules and multiple processors configured to cooperate with each-other, Central Processing Unit (CPU), a processing unit, a processing circuit, a processor, an Application Specific Integrated Circuit (ASIC), a microprocessor, a Field-Programmable Gate Array (FPGA) or other processing logic that may interpret and execute instructions. The expression "processor" and/or "processing means" may thus represent a processing circuitry comprising a plurality of processing circuits, such as, e.g., any, some or all of the ones mentioned above. The processing means may further perform data processing functions for inputting, outputting, and processing of data comprising data buffering and device control functions, such as call processing control, user interface control, or the like.

A further aspect of the present disclosure provides the advantage of being capable of differentiating a lithium starter battery from a lead-acid starter battery at a relatively low to medium levels of SoC, such as [10%-70%] SoC or [10%-80%] SoC.

This aspect of the method presented herein, is based on the realization that a slope of the charge/discharge curves over time $\Delta U/\Delta t$ is considerably higher for the Lead Acid battery compared to the lithium battery, in the major part of the SoC region 10%-85%. See example disclosed in FIG. 1. In this aspect of the method, lithium starter batteries can be differentiated from a lead-acid starter batteries at a relatively low to medium levels of SoC, such as [10%-70%] SoC, based on the difference in slope of the charge/discharge curves.

In other words, the present disclosure presents that one of the key differences between the different battery types, having relatively low to medium levels of SoC, is the slope of the voltage profile during charging of the battery, see e.g. FIG. 1. Firstly, the slope of the voltage curve $\Delta U/\Delta t$ is considerably higher for the Lead Acid system in the major part of the SoC region, e.g. 10%-85% SoC. Secondly, the voltage level U for the LiFePO4 battery is in the low-mid part of the SoC region, e.g. 10%-70% SoC, is considerably higher compared to the voltage level U of the corresponding Lead Acid battery, as can be seen in FIG. 1. If the slope of the charge/discharge curves $\Delta U/\Delta t$ is estimated periodically during the charge it will form a trajectory, in a two dimensional $\Delta U/\Delta t$ versus the battery voltage U plane, as the charging proceeds. In other words, the trajectory forms a path or trace of value pairs in a two dimensional plane formed by the slope $\Delta U/\Delta t$ and the charged battery voltage level U.

Figure 5:
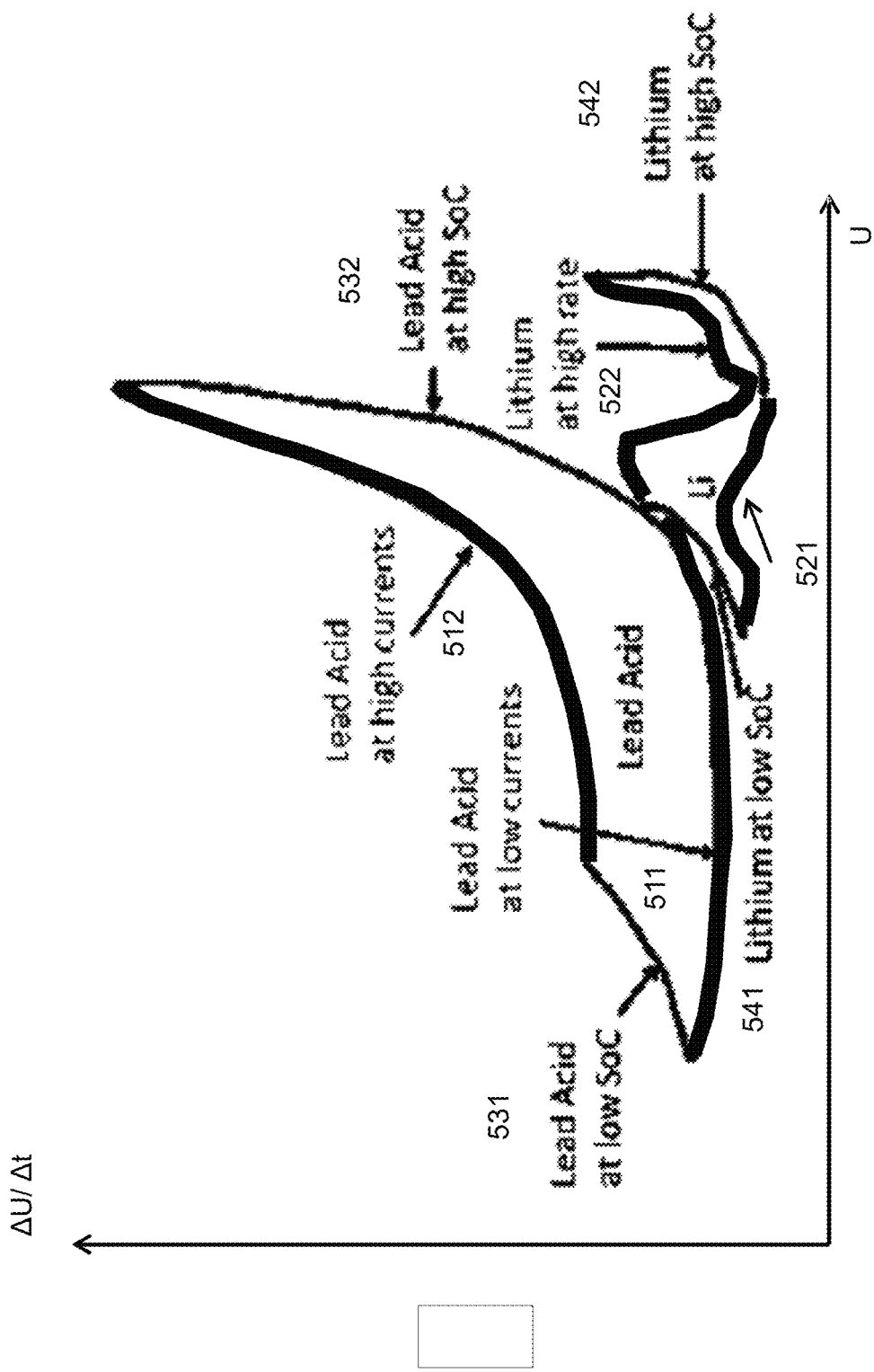
FIG. 5 illustrates examples of trajectories according to one or more embodiments of the present disclosure.

FIG. 5 illustrates examples of trajectories 511, 512, 521, 522 according to one or more embodiments of the present disclosure. Trajectories for four different cases are illustrated. The trajectories are illustrated by the thicker lines. The narrower lines correspond to constant values of the SoC 531, 532, 541, 542 for each type of battery, where the lower part of the line corresponds to slow charging/low charging current and the upper part of fast charging/high charging current.

Two Lead-Acid trajectories 511, 512 and two Lithium/LiFePO4 trajectories 521, 522 are illustrated. Trajectory 511 illustrates a trajectory for a Lead-Acid battery at low charge current levels/long charging time. Trajectory 512 illustrates a trajectory for a Lead-Acid battery at high charging current levels/short charging time. Trajectory 521 illustrates a trajectory for a lithium battery at low charging current levels/long charging time. Trajectory 522 illustrates a trajectory for a lithium battery at high charging current levels/short charging time.

The above described trajectories go from left to right in the diagram, as the SoC level increase as time passes during the course of charge.

As can be seen in FIG. 5, which is an example based on experimental data, a first region is formed by trajectories 511, 512 and the constant values of the SoC 531, 532. A second region is formed by trajectories 521, 522 and the constant values of the SoC 541, 542. The areas differ in their location in the two dimensional plane, which according to the present disclosure can be used to distinguishing between and/or to determine the type of battery, Lead-Acid or Lithium, being charged.

As can further be seen in FIG. 5, the shape of the trace/path of the trajectory as such differ, which according to the present disclosure can be used to distinguishing between and/or to determine the type of battery, Lead-Acid or Lithium, being charged.

In other words, the characteristics of the trajectories differ can be used to distinguishing between and/or to determine the type of battery, Lead-Acid or Lithium, being charged. This is further described in the following sections. A determined trajectory falling within the area formed by the trajectories 511, 512 and the constant values of the SoC 531, 532 can be determined as a Lead-Acid vehicle battery. A determined trajectory falling within the area formed by the trajectories 521, 522 and the constant values of the SoC 541, 542 can be determined as a Lead-Acid vehicle battery.

Figure 6:
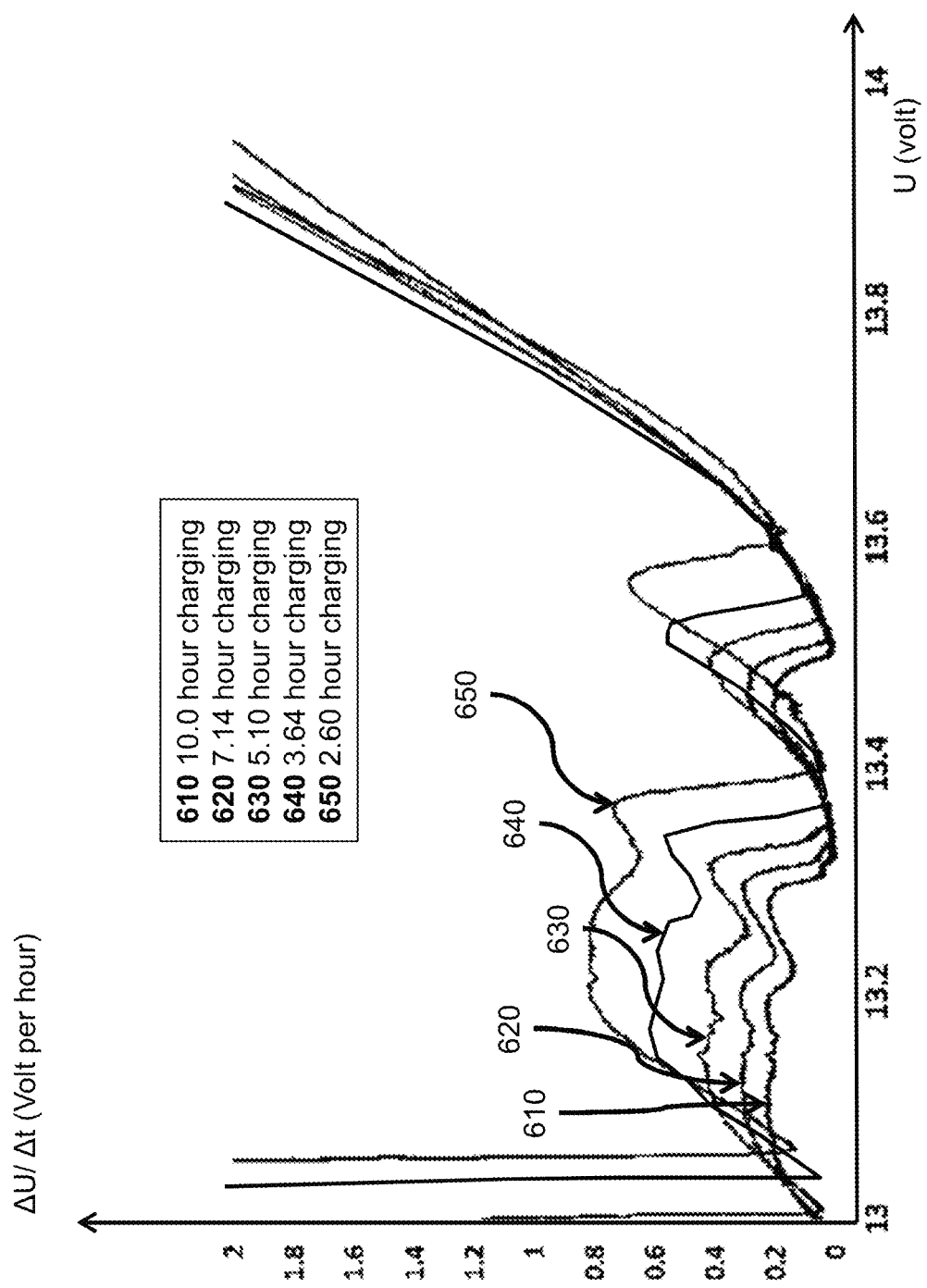
FIG. 6 shows trajectories for different battery charging currents/charging times according to one or more embodiments of the present disclosure.

FIG. 6 shows trajectories for different battery charging currents/charging times according to one or more embodiments of the present disclosure.

The present disclosure is at least partially based on the realization that one of the key differences in behavior between the two battery types Lead-Acid and Lithium, is the characteristics of the voltage curve, such as the charging/discharging profile or charging/discharging curve during the charge, as shown in relation to FIG. 1.

Firstly, the slope of the voltage curve $\Delta U/\Delta t$ is considerably higher for the Lead Acid battery in the major part of a SoC region. Secondly, the battery voltage level U, during charging, for the LiFePO4/Lithium battery is considerably higher than for the Lead Acid battery. If the slope of the voltage curve $\Delta U/\Delta t$ is estimated during charging of the battery, it will form a trajectory in the $\Delta U/\Delta t$ vs U plane as the charging proceeds. Trajectories are further described in relation to FIG. 5.

The present disclosure presents that by estimating/determining the slope $\Delta U/\Delta t$ of the voltage curve over time based on a corresponding, e.g. measured, battery voltage level U it is possible to distinguish between Lead Acid batteries and LiFePO4/Lithium batteries in the low to mid part of the SoC region, such as [10%-70%] SoC.

FIG. 6 shows trajectories for five different charging current levels/charging times, ranging from 10 hour charging 610, 7.14 hour charging 620, 5.10 hour charging 630, 3.63 hour charging 640 to 2.6 hour charging 650. In this example, the trajectories relate to a 60 Ampere hours LiFePO4/Lithium battery. As can be seen, these trajectories 610-650 are characterized by that they form several more or less sharp maxima and minima, as the battery is being charged.

These characteristics of the trajectories is in sharp contrast to characteristics of trajectories of Lead Acid batteries, where the Lead Acid trajectories follow a much smoother path/trace with a steadily increasing slope in the whole voltage region/range, e.g. the quota $\Delta U^2/\Delta t^2$ versus U is always positive.

The present disclosure takes advantage of these contrasts or differences of characteristics of the trajectories to determine the type of battery being charged, typically Lead-Acid or Lithium batteries. Furthermore, the extreme points in the Lithium battery trajectories, occurs approximately at the same SoC-level when the slope $\Delta U/\Delta t$ is plotted against the SoC, instead of the voltage, U. This is further described in relation to FIG. 8.

In one example embodiment, the technique for determining the type of battery, e.g. Lead-Acid or Lithium, or to differentiate between the two battery types, e.g. Lead-Acid or Lithium, in the low to medium SoC region can be carried out in the following way.

In a first optional step, a function for the Lead Acid battery dependent of two variables $\Delta U/\Delta t$ and U is obtained or provided. The function gives or provides the value of the SoC for a specific value pair $[\Delta U/\Delta t, U]$. The function may be obtained, provided or created by using curve fitting techniques, e.g. by curve fitting experimental data comprising triplets of a slope value, a battery voltage value a SoC value, $[\Delta U/\Delta t, U, SoC]$ to a $3^{rd}$ degree polynomial function, The experimental data may e.g. be obtained by charging several batteries and measuring/recording the experimental data. The function will then be configured to provide a SoC value for a given value pair $[\Delta U/\Delta t, U]$.

The function may have the following form:

$$SoC = K_1 U^3 + K_2\left(\frac{dU}{dt}\right)^3 + K_3 U^2 \frac{dU}{dt} + K_4 U\left(\frac{dU}{dt}\right)^2 + $$
$$K_5 U^2 + K_6\left(\frac{dU}{dt}\right)^2 + K_7 U \frac{dU}{dt} + K_8 U + K_9 \frac{dU}{dt} + K_{10}$$

Where $K_1, K_2, \ldots K_{10}$ are coefficients that may be determined by using standard least square fitting methods, typically described in the literature. Additionally or alternatively, any curve fitting technique known in to the person skilled in the art may be used.

Figure 7:
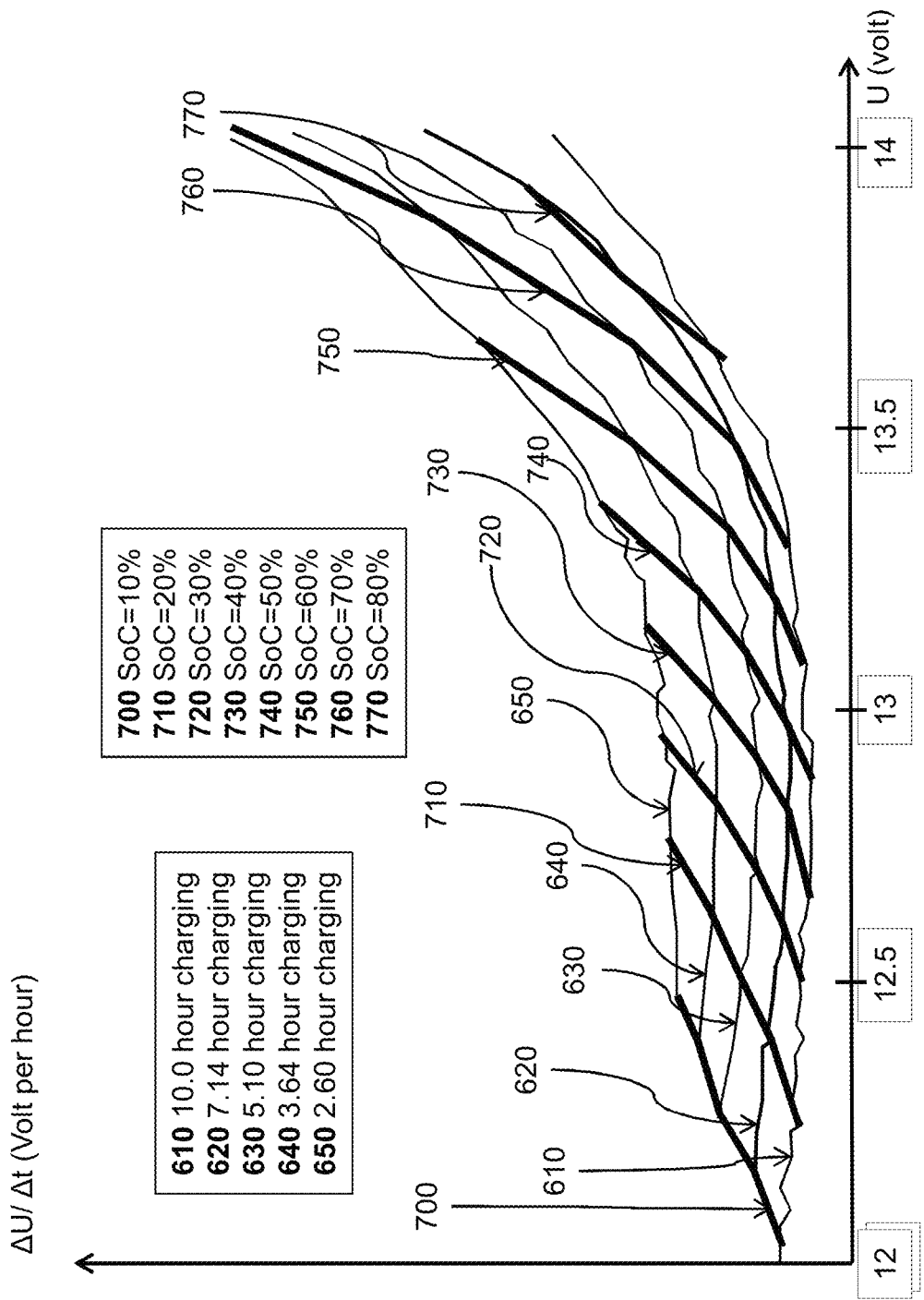
FIG. 7 illustrates details of different trajectories and the corresponding SoC levels.

Resulting areas/surfaces, formed or delimited by trajectories and constant SoC levels, is illustrated in FIG. 7, where the different trajectories and the constant SoC levels are shown.

Further, the present disclosure provides that due to the characteristics of the LiFePO4/Lithium battery, a corresponding function for the LiFePO4/Lithium battery similar to the function for the Lead-Acid battery, described above, is much more complicated to create due to the irregular behavior of the characteristics, see e.g. FIG. 6. Normal curve fitting techniques do not provide a satisfactory result when trying to provide a function for the LiFePO4/Lithium battery that could provide a SoC value for each given value pair $[\Delta U/\Delta t, U]$.

The present disclosure instead proposes to identify particular voltage ranges of the battery voltage level U, which can be applied to the trajectory to determine the battery type. These voltage ranges includes some very distinct differences in the characteristics of Lead-Acid battery trajectories and characteristics of LiFePO4/Lithium trajectories, e.g. as seen in FIG. 1. In other words, by measuring the battery voltage level over time and determining the slope $\Delta U/\Delta t$ for each measured voltage level, a trajectory can be determined. Effectively, determining the trajectory involves plotting the trajectory as a trace/path/curve in a two dimensional plane, where the slope value $\Delta U/\Delta t$ forms one axis and the battery voltage or battery voltage level U forms a second axis, as further illustrated in relation to FIG. 5. Thereby it is possible to separate the trajectory for each battery type, e.g. LiFePO4/Lithium or Lead-Acid battery types.

In one example, the battery type of the vehicle battery is determined to a lithium battery if the trajectory fulfills the criterion of decreasing slope values and increasing battery voltage levels. In some embodiments, this involves evaluating the criteria or criterion only within the identified/obtained voltage ranges. The identified/obtained voltage ranges may e.g. be predefined and include the battery voltage level range [13.3V-13.4V] and/or the battery voltage level range [13.45-13.6V].

In the battery voltage level range [13.3V-13.4V], during charge of the LiFePO4/Lithium battery, there is a strong decrease in the rate of voltage slope, $\Delta U/\Delta t$, at a particular battery voltage level U. This characteristic of the trajectory is clearly not seen when charging the Lead-Acid battery, and can be used to distinguish a LiFePO4/Lithium battery being charged from a Lead-Acid battery being charged. The same can be said for the battery voltage level U range [13.3V-13.4V]. See e.g. FIG. 6.

In a similar manner, in the battery voltage level range [13.3V-13.4V], during charge of the LiFePO4/Lithium battery, there is a strong decrease in the rate of voltage slope, $\Delta U/\Delta t$, at a particular battery voltage level U which alternatively or additionally can be used to distinguish a LiFePO4/Lithium battery being charged from a Lead-Acid battery being charged.

In one further example, the battery type of the vehicle battery is determined to a lithium battery if the trajectory fulfills the criterion of slope values being below a threshold within a predetermined voltage range. In some embodiments, this involves evaluating the criteria or criterion only within the identified voltage ranges. The battery type of the vehicle battery may be determined to a lithium battery if the trajectory fulfills the criterion of the trajectory being indicative of slope values below 0.1 Volt per hour and the corresponding measured battery voltage level value U is in a range of [13.3V-13.4V]. Alternatively or additionally, the battery type of the vehicle battery is determined to a lithium battery if the trajectory fulfills the criterion of the trajectory being indicative of slope values below 0.25 Volt per hour and the corresponding measured battery voltage level value is in a range of [13.3V-13.4V].

As mentioned above, this method described in relation to FIG. 6 is particularly suitable when charging batteries at relatively low to medium SoC levels, e.g. below approximately 70%.

FIG. 7 illustrates details of different trajectories 610-650 and the corresponding SoC levels 700-770. The slope $\Delta U/\Delta t$ of the trajectory is shown on the vertical axis. The battery voltage level value U of the trajectory is shown on the horizontal axis.

Trajectories 610-650 for Lead Acid batteries at different charging current rates are shown, corresponding to a charging time from 2.6 hours for trajectory 650 up to 10 hours for trajectory 610. SoC levels are indicated by the thinner lines. Constant SoC values are indicated by the thicker lines. In other words, the slope value $\Delta U/\Delta t$ forms one axis and the battery voltage U forms a second axis of the two dimensional plane.

Figure 8:
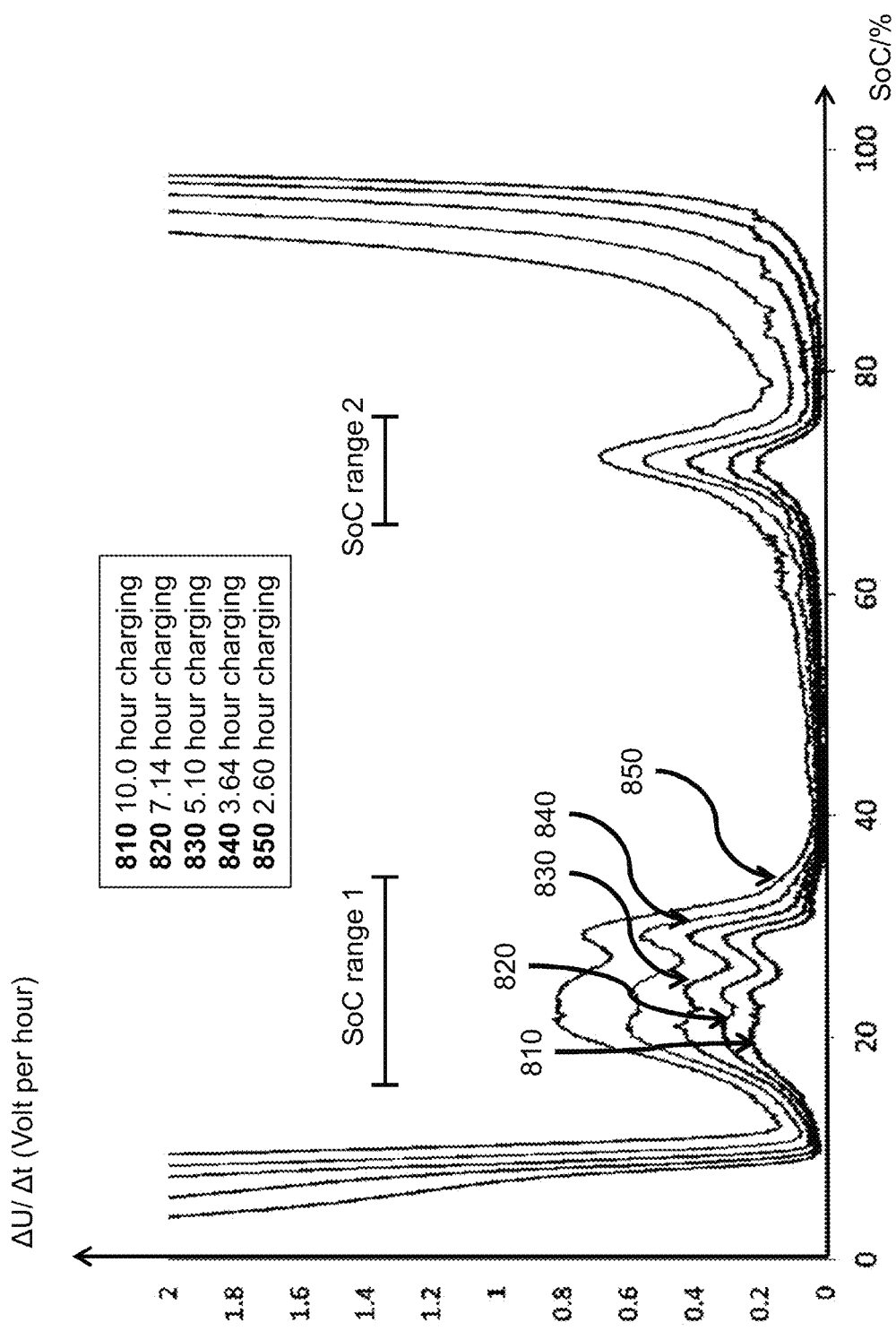
FIG. 8 shows a diagram with slope values and corresponding SoC values.

FIG. 8 shows a diagram with slope values and corresponding SoC values. Slope values $\Delta U/\Delta t$ are shown on the vertical axis and corresponding SoC values are shown on the horizontal axis. As can be seen from FIG. 8, where slope values and corresponding SoC values are plotted, the extreme points of the plot occurs approximately at the same SoC level for the different charging currents 810-850. In the example shown in FIG. 8, the extreme points of the plot occurs within SoC range 1 and SoC range 2.

Figure 9:
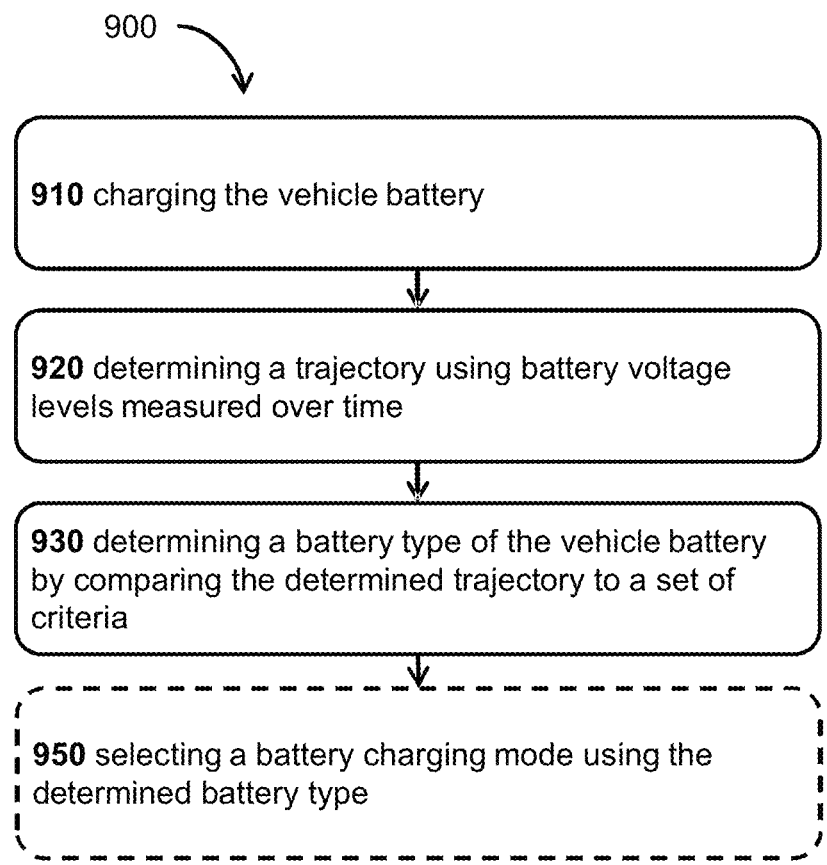
FIG. 9. illustrates a flowchart of a method performed by a battery charger configured to charge a vehicle battery according to one or more embodiments of the present disclosure.

FIG. 9 illustrates a flowchart of a method 900 performed by battery charger 400 configured to charge a vehicle battery. The method is particularly suitable when determining the type of battery, e.g. Led or Lithium, at a relatively low or medium level of SoC, such as [10%-70%] SoC, and thereafter charging the battery, based on the determination.

In one embodiment, a method 900 performed by battery charger 400 configured to charge a vehicle battery is provided, the method comprising:

Step 910: charging the vehicle battery 420. Charging may e.g. be performed by providing a constant current $I_1$ or current pulses of amplitude $I_1$ to the battery 420. Charging may e.g. be alternatively or additionally be performed by providing a dynamically variable current $I_1$ or current pulses of amplitude $I_1$ to the battery. Charging the vehicle battery may alternatively or additionally be performed according to any suitable method known in the art, e.g. constant voltage charging.

Step 920: determining a trajectory using battery voltage levels measured over time. The battery voltage levels are typically measured over time directly when charging the vehicle battery 420 and/or are statistical aggregations of measured battery voltage levels, such as averaged values, or are predefined and/or stored charge/discharge curves. The trajectory may typically be indicative of a trace or path intersecting value pairs of a slope value of the measured battery voltage levels and the corresponding measured battery voltage level value, e.g. in the two-dimensional plane as described in relation to FIG. 5-7. Determining the trajectory may involve plotting the trajectory as a curve in a two dimensional plane, where the slope value $\Delta U/\Delta t$ forms one axis and the corresponding battery voltage or battery voltage level U forms a second axis, e.g. by connecting the value pairs with a line, as further illustrated in relation to FIG. 5, FIG. 6 or FIG. 7.

In one example, the slope or slope values are determined based on the measured battery voltage levels, e.g. measured directly or retrieved as historical measured battery voltage levels from memory, e.g. a voltage curve such as a charging curve. The measured battery voltage levels being indicative of the battery voltage and/or a voltage over the poles of the battery and/or battery voltage levels for a particular battery type, when a battery is being charged.

In a non-limiting example, an initial voltage value is determined at an initial point in time and a successive voltage value is determined at a successive/subsequent point in time. The slope value can then e.g. be determined according to the relation:

$$\text{slope value}_{successive} = \frac{\Delta U}{\Delta t} = \frac{(\text{successive voltage value} - \text{initial voltage value})}{(\text{successive point in time} - \text{initial point in time})}$$

It is understood that the slope value can further be determined based on multiple voltage values and multiple successive points in time, e.g. by forming a statistical measure such as an average. Alternatively, any suitable method of determining the slope value available to the person skilled in the art may be used.

The value pair can then be formed or determined as:

value pair$_{successive}$=(slope value$_{successive}$,successive voltage value), where value pair$_{successive}$ is a successive value pair, slope value$_{successive}$ is a previously determined slope value and successive voltage value is the current battery voltage value, e.g. the latest measured battery voltage value.

Step 930: determining a battery type of the vehicle battery by comparing the determined trajectory to a set of criteria.

In one embodiment, the set of criteria compares characteristics of the determined trajectory to characteristics of a set of predetermined trajectories.

In one embodiment, the characteristics of the set of predetermined trajectories are indicative of areas/regions/surfaces formed by the predetermined trajectories and constant SoC levels, and wherein determining the battery type of the vehicle comprises determining that the determined trajectory falls within the areas/regions/surfaces formed by the predetermined trajectories. This is further described in relation to FIG. 5.

Alternatively or additionally, the characteristics of the set of predetermined trajectories are indicative of shapes of the predetermined trajectories, and wherein determining the battery type of the vehicle comprises determining that the determined trajectory matches shapes of the predetermined trajectories. This may include to determine that the path/trace if the trajectory have a particular shape, e.g. having a steadily increasing slope in the whole voltage region/range, e.g. the quota $\Delta U^2/\Delta t^2$ versus U is always positive. Determining battery type based in shape of the trajectory is further described in relation to FIG. 6.

In one embodiment, the battery type of the vehicle battery 420 is determined to a LiFePO4/Lithium battery if the trajectory fulfills a criterion of the shape of the determined trajectory being matching a predetermined trajectory indicative of decreasing slope values $\Delta U/\Delta t$ and increasing battery voltage levels U. Alternatively, the battery type of the vehicle battery is determined to a LiFePO4/Lithium battery only if slope values $\Delta U/\Delta t$ decreases with a decreasing rate above a predefined threshold. The vehicle battery 420 may determined to a LA battery if the trajectory does not fulfill the criterion of the shape of the determined trajectory being matching a predetermined trajectory indicative of decreasing slope values $\Delta U/\Delta t$ and increasing battery voltage levels U.

In one embodiment, the battery type of the vehicle battery 420 is determined to a lithium battery if the trajectory fulfills the criteria of the trajectory being indicative of slope values $\Delta U/\Delta t$ below 0.1 Volt per hour and the corresponding measured battery voltage level value U is in a range of [13.3V-13.4V]. The vehicle battery 420 may determined to a LA battery if the trajectory does not fulfill the criterion.

In one embodiment, the battery type of the vehicle battery 420 is determined to a lithium battery if the trajectory fulfills the criteria of the trajectory being indicative of slope values $\Delta U/\Delta t$ below 0.25 Volt per hour and the corresponding measured battery voltage level value U is in a range of [13.5V-13.65V]. The vehicle battery 420 may determined to a LA battery if the trajectory does not fulfill the criterion.

Optionally, the method further comprises

Optional Step 950: selecting a battery charging mode using the determined battery type.

Optional step 960: Charging the vehicle battery using the selected battery mode.

Selecting the battery charging mode may involve charging the battery in a lead-acid battery mode if a lead-acid battery type is determined, charging the battery in a lithium battery mode if a lithium battery type is determined or charging the battery in a safe mode if a unknown battery type is determined. The safe mode may involve charging the battery with a voltage that is safe for both a lead-acid battery type and a lithium battery type. In one example, a maximum charging voltage of 13.8 Volts is used in the lead-acid battery mode and the safe mode, and a maximum charging voltage of 14.6 Volts is used in the lithium battery mode.

A further aspect of the present disclosure provides the advantage of being capable of differentiating a lithium starter battery from a lead-acid starter battery with added security at low, medium and high SoC of the vehicle battery.

Figure 10:
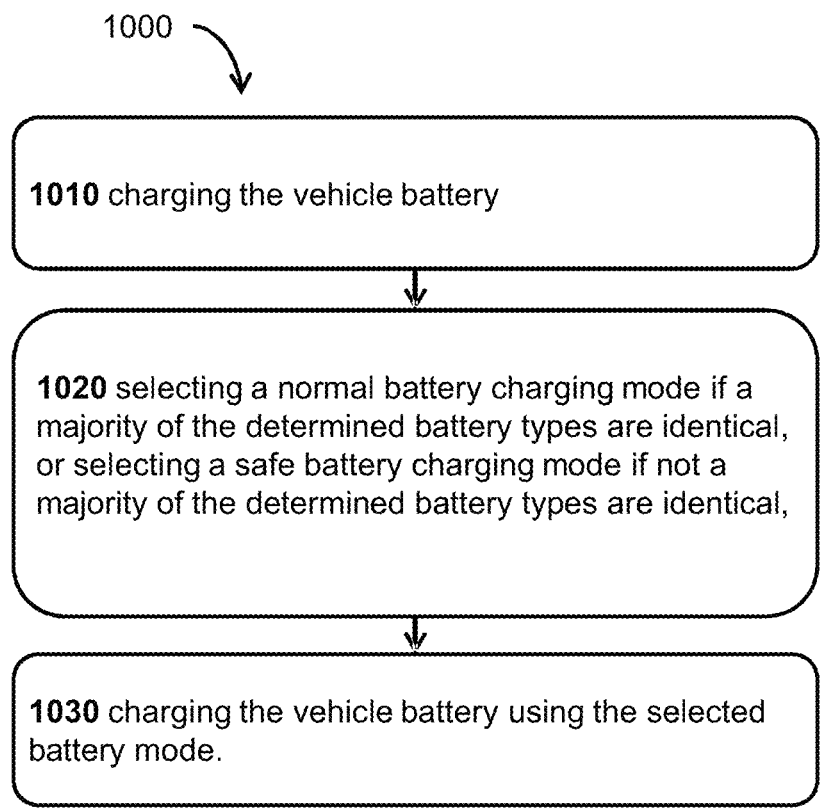
FIG. 10 illustrates a flowchart of a method 1000 performed by battery charger 400 configured to charge a vehicle battery.

FIG. 10 illustrates a flowchart of a method 1000 performed by battery charger 400 configured to charge a vehicle battery.

In one embodiment, a method performed by battery charger 400 configured to charge a vehicle battery is provided, the method comprising:

Step 1010: obtaining a plurality of determined battery types of the vehicle battery using different methods. The plurality of determined battery types are typically obtained by performing any of the methods described in relation to FIG. 2 and/or FIG. 3 and/or FIG. 9. E.g. using any of the results from step 240, step 370 or step 930.

Step 1020: selecting a normal battery charging mode if the plurality of determined battery types are identical, or selecting a safe battery charging mode if the plurality of determined battery types are not identical. Alternatively or additionally, the normal battery charging mode may be selected if a majority of the determined battery types are identical, or, selecting a safe battery charging mode if not a majority of the determined battery types are identical.

Step 1030: Charging the vehicle battery using the selected battery mode.

In one example, this may involve charging the battery in a lead-acid battery mode if a majority of lead-acid battery types is determined to being a lead-acid battery, charging the battery in a lithium battery mode if a majority of lithium battery types is determined to being a lithium battery or charging the battery in a safe mode if no majority is determined.

In one example, the method described in relation to FIG. 2 determines that a lithium battery is being charged, and the method described in relation to FIG. 9 determined that a lead-acid battery is being charged.

The safe mode may involve charging the battery with a voltage that is safe for both a lead-acid battery type and a lithium battery type. In one example, a maximum charging voltage of 14.4 Volts is used in the lead-acid battery mode and the safe mode, and a maximum charging voltage of 14.6 Volts is used in the lithium battery mode.

Finally, it should be understood that the invention is not limited to the embodiments described above, but also relates to and incorporates all embodiments within the scope of the appended independent claims.

ENUMERATED EMBODIMENTS

Embodiment 1. A method performed by battery charger 400 configured to charge a vehicle battery, the method comprising:

charging the vehicle battery until a measured voltage over the battery, or poles of the battery, exceeds a voltage threshold $U_1$, halting charging for a third time period $t_3$, measuring a second voltage $U_2$ over the battery, or poles of the battery at the end of the time period $t_3$, determining a battery type using a differential voltage $U_1 - U_2$ and a set of predetermined conditions, wherein the predetermined conditions comprise $$\text{battery type} = \begin{cases} U_{\text{diff}} > U_{Pb} \to \text{lead-acid battery type} \\ U_{\text{diff}} < U_{Li} \to \text{lithium battery type} \\ U_{Pb} > U_{\text{diff}} > U_{Li} \to \text{unknown battery type} \end{cases}$$

Embodiment 2. The method according to embodiment 1, further comprising selecting charging mode using the determined battery type.

Embodiment 3. A flowchart of a method 200 performed by battery charger 400 configured to charge a vehicle battery, the method comprising:

STEP 310: charging the vehicle battery by providing a current I1.

Step 320: repeat step 210 until a first measured voltage over the battery, or poles of the battery, exceeds a voltage threshold U1.

Optional Step 330: halt charging for a first time period t1.

Step 340: charging the vehicle battery by providing a current I1 for a second time period t2.

Optional Step 340: halt charging for a third time period t3. In other words, allow the battery to rest for a period t3.

Step 350: measure a second voltage U2 over the battery, or poles of the battery. The second voltage is typically measured after step 240 and at the end of t3. The second voltage U2 may be saved to memory.

Step 360: determine a differential voltage $U_{\text{diff}}$ by calculating U1-U2

Step 370: determining a battery type using the differential voltage and a set of predetermined conditions. The predetermined conditions may comprise $$\text{battery type} = \begin{cases} U_{\text{diff}} > U_{Pb} \to \text{lead-acid battery type} \\ U_{\text{diff}} < U_{Li} \to \text{lithium battery type} \\ U_{Pb} > U_{\text{diff}} > U_{Li} \to \text{unknown battery type} \end{cases}$$

Optional Step 380: select charging mode using the determined battery type. This may involve charging the battery in a lead-acid battery mode if a lead-acid battery type is determined, charging the battery in a lithium battery mode if a lithium battery type is determined or charging the battery in a safe mode if a unknown battery type is determined. The safe mode may involve charging the battery with a voltage that is safe for both a lead-acid battery type and a lithium battery type.

An example of $U_1$ is 14.4V. An example of $U_{Pb}$ is 1.2V and an example of $U_{Li}$ 0.8V respectively. A further example of $U_{Pb}$ is 0.7 and a further example of $U_{Li}$ is 0.6V.

The invention claimed is:

1. A method performed by battery charger configured to charge a vehicle battery, the method comprising:
    charging the vehicle battery until a first measured voltage over the battery exceeds a first voltage threshold U1,
    halting charging for a third time period,
    measuring a second voltage U2 over the battery at the end of the third time period,
    determining a battery type using a differential voltage $U_{\text{diff}}$, by calculating a difference U1–U2 of the first voltage threshold U1 and the second voltage U2, and a set of predetermined conditions, wherein the predetermined conditions comprise $$\text{battery type} = \begin{cases} U_{diff} > U_{Pb} \rightarrow \text{lead-acid battery type} \\ U_{diff} < U_{Li} \rightarrow \text{lithium battery type} \\ U_{Pb} > U_{diff} > U_{Li} \rightarrow \text{unknown battery type} \end{cases}$$

wherein $U_{diff}$ is the first voltage threshold U1 less the second voltage U2,
wherein $U_{Pb}$ is a predetermined voltage value that indicates a lead-acid battery type when the predetermined condition $U_{diff} > U_{Pb}$ is met,
wherein $U_{Li}$ is a predetermined voltage value that is lower than the predetermined voltage value $U_{Pb}$ and indicates a lithium battery type when the predetermined condition $U_{diff} < U_{Li}$ is met, and
wherein, the predetermined voltage values $U_{Pb}$ and $U_{Li}$ indicate an unknown battery type when the predetermined condition $U_{Pb} > U_{diff} > U_{Li}$ is met.

2. The method according to claim 1, further comprising selecting a charging mode and charging the vehicle battery using the determined battery type.

3. A method performed by battery charger configured to charge a vehicle battery, the method comprising:
obtaining a plurality of determined battery types of the vehicle battery using the method according to claim 1,
selecting a normal battery charging mode if the plurality of determined battery types are identical or if a majority of the determined battery types are identical, or
selecting a safe battery charging mode if the plurality of determined battery types are not identical or if not a majority of the determined battery types are identical,
charging the vehicle battery using the selected battery mode.

4. A battery charger, comprising:
processing circuitry,
a memory, comprising computer-executable instructions for causing the battery charger, when the computer-executable instructions are executed on the processing circuitry comprised in the battery charger, to perform any of the method steps according to claim 1.

5. A computer program product comprising a computer-readable storage medium, the computer-readable storage medium having a computer program embodied therein including computer-executable instructions for causing a battery charger, when the computer-executable instructions are executed on a processing unit comprised in the battery charger, to perform the method steps according to claim 1.

6. The method according to claim 1, wherein the predetermined voltage values $U_{Pb}$ is 1.2 V and the predetermined voltage value $U_{Li}$ is 0.8 V.

7. The method according to claim 1, wherein the predetermined voltage values $U_{Pb}$ is 0.7 V and the predetermined voltage value $U_{Li}$ is 0.6 V.

8. The method according to claim 1, wherein the first voltage threshold U1 is in the range of a [85%-98%] state of charge (SoC).

9. A method performed by a battery charger configured to charge a vehicle battery, the method comprising:
charging the vehicle battery by providing a current to the battery being charged,
repeating the previous step until a first measured voltage over the battery exceeds a first voltage threshold U1,
charging the vehicle battery for a second time period,
halting charging for a third time period,
measuring a second voltage U2 over the battery,
determining a differential voltage $U_{diff}$ by calculating a differential voltage U1–U2 between the first voltage threshold U1 and the second voltage U2,
determining a battery type using the differential voltage and a set of predetermined conditions wherein the predetermined conditions comprise $$\text{battery type} = \begin{cases} U_{diff} > U_{Pb} \rightarrow \text{lead-acid battery type} \\ U_{diff} < U_{Li} \rightarrow \text{lithium battery type} \\ U_{Pb} > U_{diff} > U_{Li} \rightarrow \text{unknown battery type} \end{cases}$$

wherein $U_{diff}$ is the first voltage threshold U1 less the second voltage U2,
wherein $U_{Pb}$ is a predetermined voltage value that indicates a lead-acid battery type when the predetermined condition $U_{diff} > U_{Pb}$ is met,
wherein $U_{Li}$ is a predetermined voltage value that is lower than the predetermined voltage value $U_{Pb}$ and indicates a lithium battery type when the predetermined condition $U_{diff} < U_{Li}$ is met, and
wherein, the predetermined voltage values $U_{Pb}$ and $U_{Li}$ indicate an unknown battery type when the predetermined condition $U_{Pb} > U_{diff} > U_{Li}$ is met.

10. The method according to claim 9, wherein the method further comprises selecting a charging mode using the determined battery type.

11. The method according to claim 9, wherein the predetermined voltage values $U_{Pb}$ is 1.2 V and the predetermined voltage value $U_{Li}$ is 0.8 V.

12. The method according to claim 9, wherein the predetermined voltage values $U_{Pb}$ is 0.7 V and the predetermined voltage value $U_{Li}$ is 0.6 V.

13. A method performed by battery charger configured to charge a vehicle battery, the method comprising:
obtaining a plurality of determined battery types of the vehicle battery using the method according to claim 9,
selecting a normal battery charging mode if the plurality of determined battery types are identical or if a majority of the determined battery types are identical, or
selecting a safe battery charging mode if the plurality of determined battery types are not identical or if not a majority of the determined battery types are identical,
charging the vehicle battery using the selected battery mode.

14. A battery charger, comprising:
processing circuitry,
a memory, comprising computer-executable instructions for causing the battery charger, when the computer-executable instructions are executed on the processing circuitry comprised in the battery charger, to perform the method steps according to claim 9.

15. A computer program product comprising a computer-readable storage medium, the computer-readable storage medium having a computer program embodied therein including computer-executable instructions for causing a battery charger, when the computer-executable instructions are executed on a processing unit comprised in the battery charger, to perform the method steps according to claim 9.

16. The method according to claim 9, wherein the first voltage threshold U1 is in the range of a [85%-98%] state of charge (SoC).

17. A method performed by battery charger configured to charge a vehicle battery is provided, the method comprising:
charging the vehicle battery, determining a trajectory using battery voltage levels measured over time,
determining a battery type of the vehicle battery by comparing the determined trajectory to a set of criteria,
wherein the set of criteria compares characteristics of the determined trajectory to characteristics of a set of predetermined trajectories,
wherein the characteristics of the set of predetermined trajectories are indicative of areas formed by the predetermined trajectories and constant SoC levels, and wherein determining the battery type of the vehicle comprises determining that determined trajectory falls within the areas.

18. The method according to claim 17, wherein the characteristics of the set of predetermined trajectories are indicative of shapes of the predetermined trajectories, and wherein determining the battery type of the vehicle comprises determining that the determined trajectory matches shapes of the predetermined trajectories.

19. The method according to claim 17, wherein the method further comprises selecting a battery charging mode and charging the vehicle battery using the determined battery type.

20. A method performed by battery charger configured to charge a vehicle battery, the method comprising:
obtaining a plurality of determined battery types of the vehicle battery using the method according to claim 17,
selecting a normal battery charging mode if the plurality of determined battery types are identical or if a majority of the determined battery types are identical, or
selecting a safe battery charging mode if the plurality of determined battery types are not identical or if not a majority of the determined battery types are identical,
charging the vehicle battery using the selected battery mode.

21. A battery charger, comprising:
processing circuitry,
a memory, comprising computer-executable instructions for causing the battery charger, when the computer-executable instructions are executed on the processing circuitry comprised in the battery charger, to perform the method steps according to claim 17.

22. A computer program product comprising a computer-readable storage medium, the computer-readable storage medium having a computer program embodied therein including computer-executable instructions for causing a battery charger, when the computer-executable instructions are executed on a processing unit comprised in the battery charger, to perform the method steps according to claim 17.

23. A method performed by battery charger configured to charge a vehicle battery is provided, the method comprising:
charging the vehicle battery,
determining a trajectory using battery voltage levels measured over time,
determining a battery type of the vehicle battery by comparing the determined trajectory to a set of criteria,
wherein the set of criteria compares characteristics of the determined trajectory to characteristics of a set of predetermined trajectories,
wherein the characteristics of the set of predetermined trajectories are indicative of shapes of the predetermined trajectories, and wherein determining the battery type of the vehicle comprises determining that the determined trajectory matches shapes of the predetermined trajectories,
wherein:
the battery type of the vehicle battery is determined to a LiFePO4/Lithium battery if the trajectory fulfills a criterion of the shape of the determined trajectory matching a predetermined trajectory indicative of decreasing slope values and increasing battery voltage levels, or
the vehicle battery is determined to a Lead-Acid battery if the trajectory does not fulfill the criterion.

24. The method according to claim 23, wherein the battery type of the vehicle battery is determined to a LiFePO4/Lithium battery only if the slope values decreases with a decreasing rate above a predefined threshold.

25. A method performed by battery charger configured to charge a vehicle battery, the method comprising:
obtaining a plurality of determined battery types of the vehicle battery using the method according to claim 23,
selecting a normal battery charging mode if the plurality of determined battery types are identical or if a majority of the determined battery types are identical, or
selecting a safe battery charging mode if the plurality of determined battery types are not identical or if not a majority of the determined battery types are identical,
charging the vehicle battery using the selected battery mode.

26. A battery charger, comprising:
processing circuitry,
a memory, comprising computer-executable instructions for causing the battery charger, when the computer-executable instructions are executed on the processing circuitry comprised in the battery charger, to perform the method steps according to claim 23.

27. A computer program product comprising a computer-readable storage medium, the computer-readable storage medium having a computer program embodied therein including computer-executable instructions for causing a battery charger, when the computer-executable instructions are executed on a processing unit comprised in the battery charger, to perform the method steps according to claim 23.

28. A method performed by battery charger configured to charge a vehicle battery is provided, the method comprising:
charging the vehicle battery,
determining a trajectory using battery voltage levels measured over time,
determining a battery type of the vehicle battery by comparing the determined trajectory to a set of criteria,
wherein the set of criteria compares characteristics of the determined trajectory to characteristics of a set of predetermined trajectories,
wherein the characteristics of the set of predetermined trajectories are indicative of shapes of the predetermined trajectories, and wherein determining the battery type of the vehicle comprises determining that the determined trajectory matches shapes of the predetermined trajectories,
wherein the battery type of the vehicle battery is determined to a LiFePO4/lithium battery if the trajectory fulfills the criteria of the trajectory being indicative of slope values below 0.1 Volt per hour and the corresponding measured battery voltage level value is in a range of [13.3V-13.4V], or
the vehicle battery is determined to a Lead-Acid battery if the trajectory does not fulfill the criterion.

29. A method performed by battery charger configured to charge a vehicle battery is provided, the method comprising:
charging the vehicle battery,
determining a trajectory using battery voltage levels measured over time, determining a battery type of the vehicle battery by comparing the determined trajectory to a set of criteria, wherein the set of criteria compares characteristics of the determined trajectory to characteristics of a set of predetermined trajectories, wherein the characteristics of the set of predetermined trajectories are indicative of shapes of the predetermined trajectories, and wherein determining the battery type of the vehicle comprises determining that the determined trajectory matches shapes of the predetermined trajectories, wherein the battery type of the vehicle battery is determined to a LiFePO4/lithium battery if the trajectory fulfills the criteria of the trajectory being indicative of slope values below 0.25 Volt per hour and the corresponding measured battery voltage level value is in a range of [13.5V-13.65V], or the vehicle battery is determined to a Lead-Acid battery if the trajectory does not fulfill the criterion.

* * * * *